Figure 1:
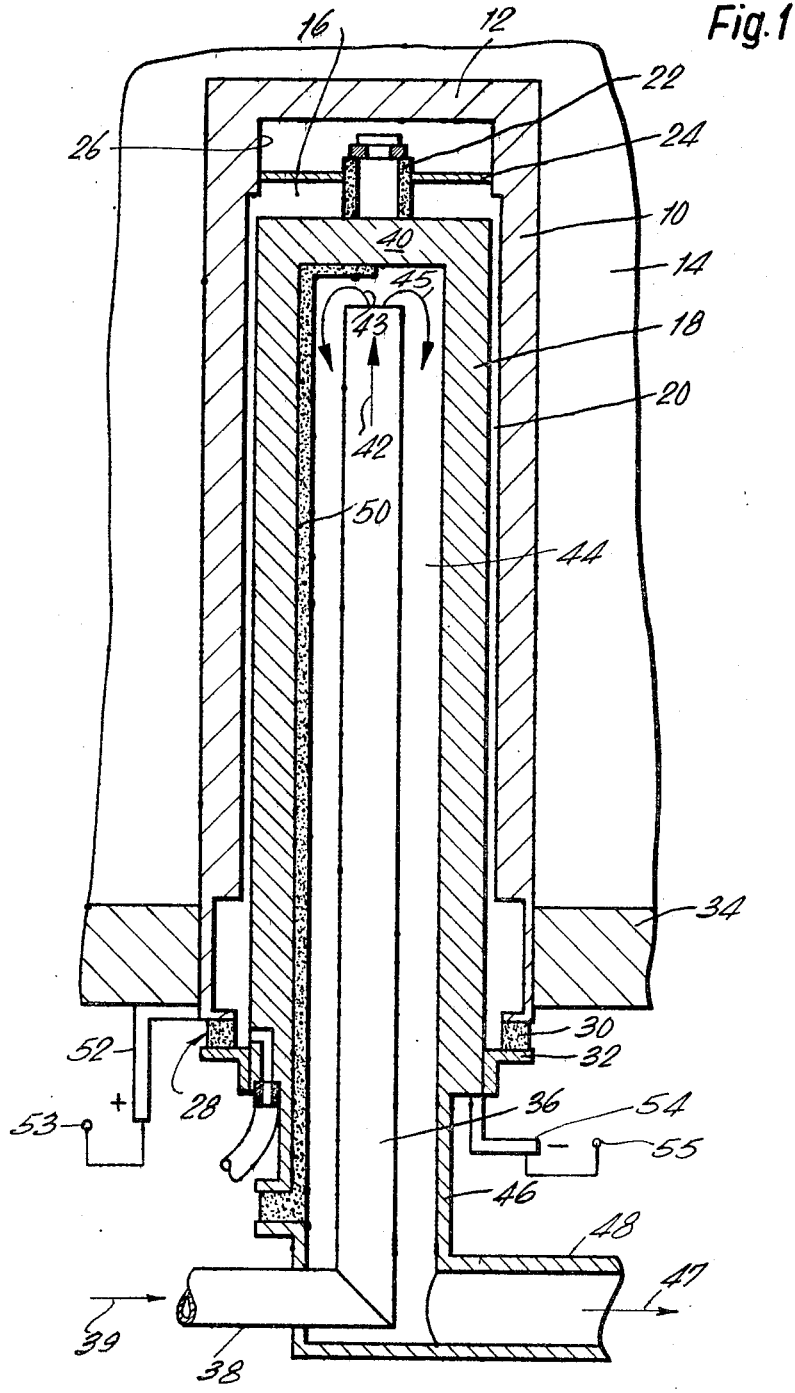

United States Patent

[11] 3,578,991

[72] Inventors Franz Gross
Neckargemund;
Rudolf Krapf, Leimen, Germany
[21] Appl. No. 670,187
[22] Filed Sept. 25, 1967
[45] Patented May 18, 1971
[73] Assignee Brown, Boveri & Cie A. G.
Kallsladter Str., Germany
[32] Priority Sept. 27, 1966
[33] Germany
[31] B89094

[54] THERMIONIC CONVERTER WITH CONCENTRIC
COLLECTOR AND EMITTER
2 Claims, 2 Drawing Figs.
[52] U.S. Cl. ....................................... 310/4,
176/39
[51] Int. Cl. ....................................... H01j 45/00
[50] Field of Search.......................... 360/4;
196/39

[56] References Cited
UNITED STATES PATENTS
| | | | |
|---|---|---|---|
| 3,079,527 | 2/1963 | Opfermann.................. | 310/4X |
| 3,093,567 | 6/1963 | Jablonski et al.............. | 310/4X |
| 3,139,542 | 6/1964 | Huber et al................... | 310/4 |
| 3,201,619 | 8/1965 | Gleason....................... | 310/4 |

Primary Examiner—Donovan F. Duggan
Attorney—Nathan M. Briskin

ABSTRACT: A thermionic converter for converting heat energy directly into electrical energy, the heat being derived from the use in the device of nuclear fuel. In the device the emitter is so disposed as to extend into the mass of nuclear fuel, and has a chamber formed therewithin in which there is disposed the collector electrode element, but spaced from the emitter so as to form a sealed interspace chamber which is filled with a gaseous vapor such as caesium vapor. Electric terminals are provided for carrying outwardly to an electric line the electrical energy from the coupled emitter and collector, and coolant means are provided for conducting coolant fluid into the interior of the collector.

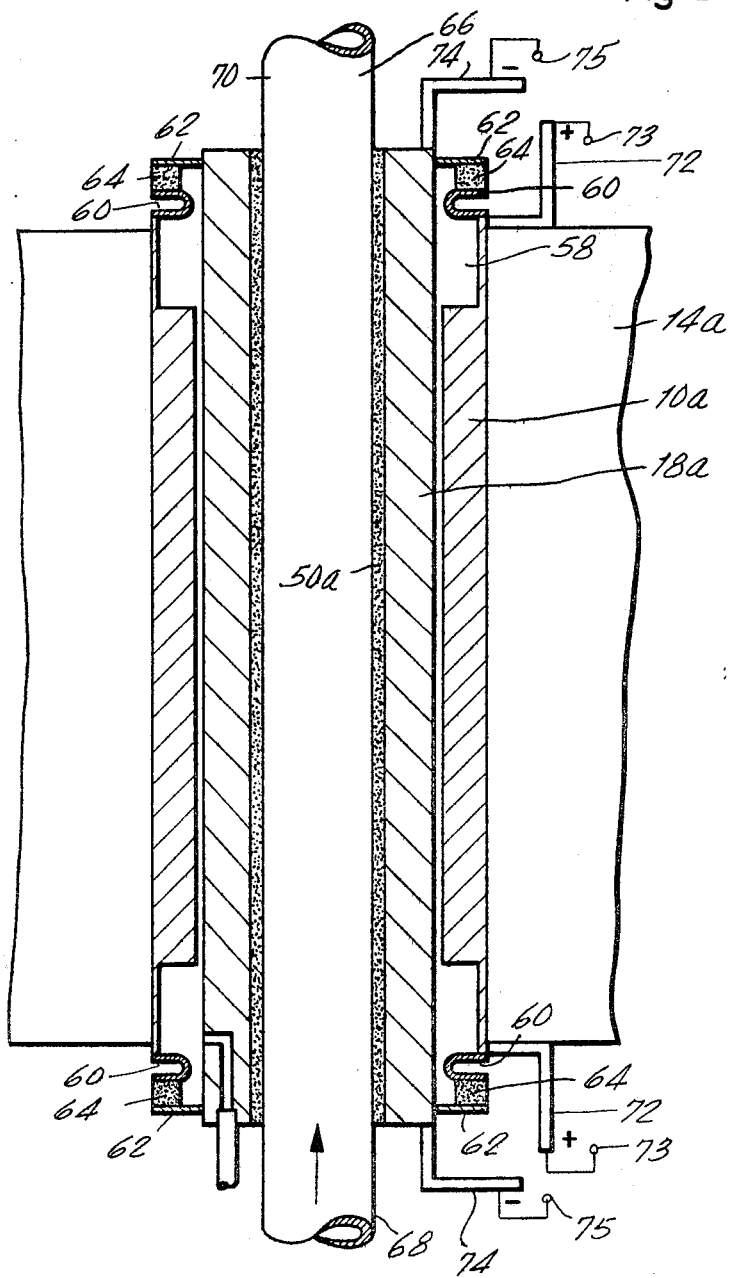

THERMIONIC CONVERTER WITH CONCENTRIC COLLECTOR AND EMITTER

This invention relates to improvements in thermionic converter devices. For background information, reference is made to copending application entitled "NUCLEAR REACTOR WITH THERMIONIC CONVERTERS," Ser. No. 637,822, filed May 11, 1967, of Kurt Stahl, Reinhart Langpape and Ned S. Rasor; and also the copending application entitled "THERMIONIC FUEL ROD WITH NUCLEAR FUEL," Ser. No. 657,820, of Franz Gross, Alfred Jester, Rudolf Krapf and Hubert Holick, filed Aug. 2, 1967, both assigned to the assignee of the present application.

An object of the present invention is to provide a novel and improved thermionic converter in which heat energy is converted directly into electrical energy.

Another object of the invention is to provide a novel and improved thermionic converter or transducer in which there are concentrically arranged an emitter and a colled collector, the concentric arrangement being maintained by means of metal-ceramic components, the emitter and collector being electrically insulated from each other.

A further object of the invention is to provide a novel and improved thermionic converter in which the collector is formed as the inside electrode, and the emitter constructed as the outside electrode, the collector and emitter being surrounded by the nuclear fuel of a fast reactor.

Still another object of the invention is to provide a novel and improved thermionic transducer of the type described, in which there are metal-ceramic components for mutual centering of the electrodes, at least one of the said components being constructed and arranged to function during expected heat expansion of one of the electrodes for maintaining said mutual concentricity; and also in which the inside chamber of the collector contains devices for inlet and outlet of the coolant.

Still a further object of the invention is to provide a novel and improved thermionic transducer which is simple in construction and design, formed of very few parts, of easily made geometric forms, by mass production methods, and at low cost.

The above and other objects and advantages of the invention will become apparent from the following description of preferred embodiments thereof as illustrated in the accompanying drawings.

In the drawings:

FIG. 1 is a longitudinal sectional elevational view of a converter according to the invention; and FIG. 2 is a longitudinal sectional elevational view of a modified form of the converter shown in FIG. 1.

Thermionic energy transducers or converters are used for converting heat energy directly into electrical energy. The converters are comprised of two closely spaced adjacent electrodes, one of which, known as the emitter, is so strongly heated that it emits electrons, which are then removed by the other electrode, known as the collector. The resulting difference of the respective outlet terminals is available as a source of electrical energy.

As is known from thermionic emission tubes, a negative space charge occurs in front of an electron-emitting surface, which impedes the further outlet of electrons. For this reasons, the distance between the electrodes is made quite small, or the negative spaced charge is compensated by positive ions. For this purpose, caesium vapor is primarily used.

Known nuclear fission processes may be used as a heating source. In known devices for thermic reactors, the nuclear fuel is assembled with the electrodes into a thermionic converter, several of which being electrically connected in series with a thermionic fuel rod. In the present case, the nuclear fuel is located inside the emitter. The resulting fission gases are collected in a special space or chamber from which they may be constantly pumped off.

Such nuclear fuel rods as above described form, for example, together with the moderator, the reflector, and the regulating or control rods, a thermic nuclear reactor. For further background information and details reference may be had to the periodical publication "Atomkern-Energie," 1965, volume 9/10, page 365. When such nuclear reactors are intended to be used in space vehicles to supply energy for the airborne equipment, the goal should be the least possible capacity weight (i.e. mass per capacity unit), since the mass plays such a decisive role in such uses due to the high cost of transport.

For this reason, fast reactors are preferred for large capacities over 200 kW$_{el}$, since the absence of the moderator in the reactors permits a more compact device at a lower capacity weight. Thus, it has been suggested, for example, in a known embodiment described in the periodical publication "Atomkern-Energie," 1965, volume 9/10, page 368, to install the thermionic fuel rods in the fission zone or region of a fast reactor, in a hexagonal grid or control electrode within the pressure container.

Fast reactors which are designed for a capacity range up to 2 MW$_{th}$, must contain about 50 percent of their total weight, in nuclear fuel, so that the entire device could still become critical. Approximately 30—35 percent volume share of the core must furthermore be used for coolants, so that only about 15—25 percent of the volume share of the core is available for the thermionic elements. Such a distribution the volume share of nuclear fuel and thermionic elements cannot be attained, within the above-discussed discussed capacity range, in a device which contains the nuclear fuel inside a cylindrical emitter.

Hence, it is an important object of the present invention to avoid the above described disadvantages which occur in the core of such thermionic converters. The solution of the problem according to the present invention is thus characterized by the fact that the construction is such that the collector is formed as the inside electrode of a concentric arrangement, and the emitter formed as the outside electrode of the arrangement, and is surrounded by the nuclear fuel of a fast reactor.

In this construction, the mutually concentric elements are maintained in such concentric relative positions by means of suitable components made of suitable materials, such as, for example, metal-ceramic components, at least one of which is designed to flex or yield during movement of an element of said device due to heat expansion or otherwise, without breaking the vacuum-tight seal. In addition, the inside chamber or space of the collector contains devices for the inlet and outlet of the coolant medium.

In order to understand more clearly the nature of the invention, and the best means for carrying it out, reference may be had to the accompanying drawings, in which like numerals denote functionally similar parts throughout the several views.

As seen in FIG. 1, there is illustrated an emitter 10, which is installed with its closed front end wall 12 facing into the nuclear fuel mass 14 (shown in fragment). The emitter 10 is adapted to receive a mass 14 of nuclear fuel surrounding the emitter 10, the latter being disposed within a bore in the fuel mass 14. The emitter 10 has a central chamber 16 formed therein, which is closed at one end thereof by end face wall 12 of emitter 10. A collector 18 is disposed inside the central chamber 16, being spaced from emitter 10 by an interspace such as indicated at 20. The emitter 10 together with the collector 18 arranged inside of it, forms the gas discharge chamber 20 of the thermionic energy converter. This chamber 20 is preferably filled with a vapor consisting essentially of caesium and forms a passage for conducting the vapor to chamber 16.

The converter device, with its emitter and collector, is sealed vacuum-tightly by means of the metal-ceramic components illustrated, which simultaneously serve for centering the collector 18a concentrically within the emitter 10a, and which components compensate for or balance the heat expansion of the collector 18. To this end, the front or upper end face 40 of the collector electrode 18 has a ceramic insulating ring 22 carried thereby, with an attached metal disc 24 functioning as a guide ring. The guide ring 24 yieldably glides along on the inside wall surface 26 of the emitter 10 as needed to compensate for dimensional changes due to heat expansion.

At the lower portion of FIG. 1, it is seen that there is provided a rigid metal-ceramic component indicated generally at 28, formed of a ceramic insulating ring member 30, and a rigid metallic flanged ring member 32 secured to the collector 18. The members 30, 32 serve to seal and join in a vacuum-tight manner the emitter 10, the collector 18 and the reflector 34, which is located outside of and surrounding the emitter 10 and beneath the fuel 14. This construction largely eliminates any stressing of the components by heat-produced tensions which may result from large differences in temperature occurring during operation of the device. Known means may be employed for securing the mentioned elements to their respective related elements, as described.

The rigid flanged metallic ring member 32 at the lower end of the collector electrode 18 acts, in combination with ceramic ring 30, to support the collector against movement relative to said emitter 10 and thus maintains the concentricity of members 10 and 18 as well as the width of interspace 20 therebetween. The ceramic insulating ring 30 engages the metallic supporting ring 32 on the lower surface thereof, and engages the emitter 10 on the upper surface thereof, thus insulating the metallic ring 32 from the emitter 10.

For circulation of a coolant, counterflow conduit and duct means are provided in the form of a liquid inlet or delivery conduit or pipe 36, leading from a coolant source pipe 38, or header, the pipe 36 being substantially concentric or coaxial with the axis of the collector 18 and spaced therefrom to allow for circulation of the coolant fluid upwardly to the vicinity of the front face 40 of the collector as indicated by directional arrow 42, and then flows downwardly in the opposite direction along the inner wall of collector 18, through space 44, and out through the connecting nozzle 46 and coolant outlet tube or duct 48. The directional arrows 39, 42, 43, 45 and 47 indicate the successive counterflow direction in which the coolant travels from inlet 38 to outlet 48.

If the thermionic converters are to be connected in series, the flowing metallic cooling medium or fluid in conduits 36 and 44 should be insulated from the collector 18 by a suitable layer of lining material 50 on the inner wall of collector 18, shown only in fragment for simplicity in the view of FIG. 1, and of a protective material such as beryllium oxide coated thereon.

As seen in FIG. 1, electrical terminals 53 and 55, connected respectively at 52 and 54 to the emitter 10 and the collector 18 are the positive and negative electric outlet terminals of the converter device. The terminals 53, 55 may be suitably connected for conducting transduced electric current from these elements 52 and 54 to a power consuming or measuring source.

In the modification shown in FIG. 2, it is seen that the nuclear fission zone 50a is laid out generally as a flat cylinder, that is, one whose height amounts to less than the length of the element. In this modified form of the device, there is again shown the nuclear fuel 14a into which is embedded the emitter 10a, the emitter concentrically surrounding and spaced from the collector 18a, thus forming therebetween the gas discharge chamber 58, which is filled with caesium vapor. As seen in the view of FIG. 2, means are provided for accommodating to the thermal expansion of the related elements. For this purpose, flexible metal-ceramic components 60, and 60 are cooperatively arranged, respectively, above and below the core portion, to effect a vacuum-tight seal where needed. These components are composed, first of a metal bellows 60 formed of flexible bellows material expansible and collapsible axially as needed, and secured to the emitter 10a at one end of the respective bellows 60. Secondly, a metal ring member 62 is provided which may be welded to the wall of the collector 18a; and thirdly a ceramic ring member 64 is arranged between, and electrically insulating the elements 60 and 62. While only one bellows section 60 is shown at top and bottom portions of the device, it is understood that more portions may be employed if needed.

As seen further in FIG. 2, there is provided a coolant flow pipe 66 through which flows the coolant which absorbs the waste heat from a source at one end 68 thereof to an outlet of pipe 66 at 70. As previously explained, the coolant flow pipe may be lined with insulation material 50a or other suitable material. This modification of construction of FIG. 2 is seen to be characterized by its particular simplicity and low thermal stress at the connecting points, especially in view of the unidirectional flow-through construction.

In the form of the invention shown in FIG. 2, there is provided electric terminal components 72 for positive electric terminal connections 73, component 72 being connected to the emitter 10a; and electric terminal components 74 for negative terminal connections 75 connected to the collector 18. As is shown in FIG. 2, such terminals and components may be located at both ends of the elements for facilitating series or multiple interconnection as desired.

The use of the thermionic converters arranged and constructed according to the present invention permits accommodation, at a given volume, of a larger amount of nuclear fuel than was possible with previously known arrangements of emitter and collector. In this manner there is made possible the desirable goal of a lower capacity weight; and accordingly, a less concentrated nuclear fuel may be used. In addition, special measures or pumps heretofore used for removing the fission gases in the emitter may become unnecessary, because according to this construction the fission gas may be allowed to diffuse undisturbed or freely flow to the surface of the nuclear fuel.

Although specific embodiments of the invention have been disclosed herein, it is to be understood that these are shown and described by way of example only, and not by limitation, and that various changes may be made in size, shape, materials and arrangements of the structure by those skilled in the art, without departing from the spirit and scope of the invention as set forth in the claims annexed hereto.

We claim:

1. A thermionic converter having a concentrically arranged emitter and cooled collector, electrically insulated from one another by means of centered metal-ceramic structural parts, for a fast reactor in a capacity range up to 2 megawatts thermic power, wherein the collector is formed as an inner electrode and the emitter spaced therefrom as an outer electrode, whereby solid nuclear fuel of the fast reactor surrounds the emitter, and the spacing between the inner collector electrode and the outer emitter electrode forming an annular interspace chamber containing a vapor having positive ions therein and communicating with a central chamber beyond an end of the collector electrode, said thermionic converter being convectively cooled inside its fission zone, said collector electrode being constructed and arranged to be capable of freely expanding and contracting within the interspace chamber between the concentric electrodes during operation of said converter, and spacing means for maintaining said collector electrode in interspaced relation relative to said emitter electrode, wherein said spacing means comprises rigid metallic supporting means carried by said collector electrode at a first end thereof for supporting said collector electrode at said first end, first ceramic spacing insulating means engaging said metallic supporting means and said emitter electrode for insulating said metallic supporting means and said emitter electrode from each other, said collector electrode carrying at a second end thereof yieldable spacing means permitting expansion, said yieldable spacing means comprising second ceramic spacing insulator means carried by said collector electrode at its second end thereof and movable therewith during operation, and a second metallic supporting means carried by said second ceramic spacing insulator means and movable therewith, said second insulator slidably engaging said emitter electrode for maintaining said interspaced relation between said collector and emitter electrode.

2. A thermionic converter having a concentrically arranged emitter and cooled collector, electrically insulated from one another by means of centered metal-ceramic structural parts, for a fast reactor in a capacity range up to 2 megawatts thermic power, wherein the collector is formed as an inner electrode and the emitter spaced therefrom as an outer electrode, whereby solid nuclear fuel of the fast reactor surrounds the emitter, and the spacing between the inner collector electrode and the outer emitter electrode forming an annular interspace chamber containing a vapor having positive ions therein and communicating with a central chamber beyond an end of the collector electrode, said thermionic converter being convectively cooled inside its fission zone, the means surrounding the emitter electrode for receiving nuclear fuel defining a bore formed therethrough, said emitter electrode being disposed within said bore, said emitter electrode having a central opening passage formed therein, said collector electrode being disposed in said central opening passage and incompletely filling the same and being spaced from said emitter electrode to define said interspace chamber therebetween, electric outlet terminals connected to said emitter electrode and collector electrode for conducting transduced electric current therefrom, said interspace chamber being adapted to receive and contain a gaseous vapor, coolant duct means extending through said collector electrode for conducting fluid coolant therethrough, duct insulating means interposed between said coolant duct means and said collector electrode for insulating said coolant duct means and collector electrode from each other, expansible bellows means carried at one end of the latter by said emitter electrode, ceramic insulation means joining the other end of said bellows means insulatedly to said collector electrode and maintaining a tight seal of said interspace chamber, while at the same time being constructed to allow free expansion of said emitter and collector electrode during operation of said device, whereby heat energy from the nuclear fuel is transduced into electrical energy available for connection to power consuming means at said terminals.